US009662673B2

(12) United States Patent
Schenke et al.

(10) Patent No.: US 9,662,673 B2
(45) Date of Patent: May 30, 2017

(54) COATING AGENT PUMP

(71) Applicant: Durr Systems GmbH, Bietigheim-Bissingen (DE)

(72) Inventors: Bjorn Schenke, Flein (DE); Roland Gerlach, Bietigheim-Bissingen (DE); Ralf Schafer, Ludwigsburg (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/766,764

(22) PCT Filed: Feb. 5, 2014

(86) PCT No.: PCT/EP2014/000308
§ 371 (c)(1),
(2) Date: Aug. 10, 2015

(87) PCT Pub. No.: WO2014/124736
PCT Pub. Date: Aug. 21, 2014

(65) Prior Publication Data

US 2015/0375249 A1 Dec. 31, 2015

(30) Foreign Application Priority Data

Feb. 18, 2013 (DE) ........................ 10 2013 003 620

(51) Int. Cl.
*B67D 1/08* (2006.01)
*B05B 15/02* (2006.01)
(Continued)

(52) U.S. Cl.
CPC .......... *B05B 15/025* (2013.01); *B05B 5/1675* (2013.01); *B05B 12/14* (2013.01); *B05B 12/149* (2013.01); *B05B 13/00* (2013.01)

(58) Field of Classification Search
CPC ... B05B 15/025; B05B 15/1675; B05B 12/14; B05B 12/149; B05B 13/00; F04B 53/10;
(Continued)

(56) References Cited

U.S. PATENT DOCUMENTS 3,043,227 A * 7/1962 Everett ............... A61M 1/1037 128/DIG. 3
3,164,101 A * 1/1965 Van Nederynen .... F01L 25/063 417/390
(Continued)

FOREIGN PATENT DOCUMENTS

DE 19827213 A1 1/1999
DE 10029928 A1 1/2002
(Continued)

OTHER PUBLICATIONS

International Search Report and Written Opinion for PCT/EP2014/000308 mailed on Apr. 22, 2014 (11 pages).

*Primary Examiner* — J. Casimer Jacyna
*Assistant Examiner* — Benjamin R Shaw
(74) *Attorney, Agent, or Firm* — Bejin Bieneman PLC

(57) ABSTRACT

A coating agent pump for conveying a coating agent, in particular a paint, an adhesive or a sealing agent. The coating agent pump comprises a pump inlet for admitting the coating agent to be conveyed and a pump outlet for delivering the coating agent conveyed by the coating agent pump. In addition to the pump inlet and the pump outlet, a cleaning opening is provided for cleaning the coating agent pump of the coating agent situated in the coating agent pump.

8 Claims, 4 Drawing Sheets

(51) Int. Cl.
*B05B 5/16* (2006.01)
*B05B 12/14* (2006.01)
*B05B 13/00* (2006.01)

(58) Field of Classification Search
CPC .... F04B 53/1097; F04B 43/026; F04B 43/02; F04B 45/04
USPC ................ 222/148; 417/431, 432, 440, 430; 239/114, 104; 137/240
See application file for complete search history.

(56) References Cited

U.S. PATENT DOCUMENTS

| | | | | | |
|---|---|---|---|---|---|
| 4,375,865 | A * | 3/1983 | Springer | B05B 12/14 | 118/302 |
| 4,400,147 | A * | 8/1983 | Springer | F04C 13/005 | 417/283 |
| 4,509,684 | A * | 4/1985 | Schowiak | B05B 12/14 | 239/112 |
| 4,953,403 | A * | 9/1990 | Springer | G01F 15/12 | 73/198 |
| 6,050,498 | A * | 4/2000 | Minoura | B05B 12/1409 | 239/112 |
| 6,116,261 | A * | 9/2000 | Rosen | B01F 5/0256 | 134/102.2 |
| 8,225,968 | B2 * | 7/2012 | Schaupp | F04C 2/18 | 222/148 |
| 2010/0183817 | A1 * | 7/2010 | Nakazono | B05B 5/1675 | 427/458 |
| 2010/0243101 | A1 * | 9/2010 | Matsumoto | B05B 3/1064 | 141/27 |
| 2010/0301069 | A1 * | 12/2010 | Bensley | F04B 53/14 | 222/148 |

FOREIGN PATENT DOCUMENTS

| | | | |
|---|---|---|---|
| DE | 102006041677 | A1 | 3/2008 |
| EP | 1666158 | A2 | 6/2006 |

* cited by examiner

COATING AGENT PUMP

CROSS-REFERENCE TO RELATED APPLICATIONS

This application is a national stage of, and claims priority to, Patent Cooperation Treaty Patent Application No. PCT/EP2014/000308, filed on Feb. 5, 2014, which claims priority to German Application No. DE 10 2013 003 620.8, filed Feb. 18, 2013, each of which applications are hereby incorporated herein by reference in their entireties.

BACKGROUND

In painting systems for painting components (e.g., motor vehicle bodywork components), conventionally, for conveying the coating agent to be applied, coating agent pumps are used which can be configured, for example, as diaphragm pumps. When the coating agent to be conveyed is changed (e.g., on a change of colour in a painting system), the coating agent pump must be cleaned, wherein the previously conveyed coating agent must be removed as completely as possible from the coating agent pump, because the previously conveyed coating agent otherwise causes contamination of the new coating agent. For this purpose, it is known from the prior art to rinse the coating agent pump with a rinsing agent, wherein the rinsing agent is fed in via the pump inlet and leaves the coating agent pump again via the pump outlet.

A disadvantage of this known cleaning method for cleaning a coating agent pump is that a residue of the previously conveyed coating agent and/or cleaning agent remains in the coating agent pump.

This has the consequence, in the first place, that when the coating agent is changed, part of the new coating agent must initially be discarded, because the new coating agent is initially contaminated with residues of the old coating agent and/or cleaning agent. Because new coating agent must be rejected on a change of coating agent, the coating agent consumption is unavoidably increased.

In the second place, a coating agent change is herein not possible without interruption because in addition to the rinsing of the coating agent pump, some time elapses until the new coating agent is no longer contaminated with the old coating agent and/or cleaning agent. A disadvantage therefore also lies in the relatively long cleaning pause on a change of coating agent.

Furthermore, it must be considered that coating agent residues remaining in the coating agent pump after a cleaning process must be discarded, which also leads to an increased coating agent use.

From DE 198 27 213 A1, there is known a coating agent pump which has a plurality of pump inlets, wherein the cleaning of the coating agent pump takes place in that cleaning agent is fed into the coating agent pump via one of the pump inlets. This coating agent pump also has the disadvantages discussed above.

With regard to the prior art, reference is also made to DE 100 29 928 A1.

SUMMARY

Disclosed herein is a coating agent pump for conveying a coating agent, in particular a paint, an adhesive or a sealing agent, and also cleaning a coating agent pump of this type.

The present disclosure encompasses the general technical teaching that cleaning of the coating agent pump is not to be carried out exclusively via the pump inlet and the pump outlet, but at least partially by a separate cleaning opening which is provided in addition to the pump inlet and the pump outlet.

In one example, the cleaning opening is an ejection opening through which an ejection medium (e.g., compressed air) can be fed into the coating agent pump to eject the coating agent and/or cleaning agent situated in the coating agent pump out of the coating agent pump, in particular through the pump outlet.

Therefore, the coating agent and/or cleaning agent remaining in the coating agent pump can leave the coating agent pump via the already present pump outlet. However, it is also possible in the present context that coating agent and/or cleaning agent remaining in the coating agent pump is ejected out of the coating agent pump via the pump inlet or via an additional further opening.

In another example, however, the cleaning opening serves to conduct away the coating agent remaining in the coating agent pump, so that during a cleaning process, the coating agent leaves the coating agent pump via the cleaning opening.

It was briefly mentioned above that the ejection medium may be compressed air which, for example, is already available in a painting system and can therefore also be used without great effort to eject the coating agent remaining in the coating agent pump out of the coating agent pump. In this case, a cleaning opening is a blowing-out opening into which the blowing-out air is introduced as the ejection medium to blow out the coating agent situated in the coating agent pump during a cleaning process, wherein the remaining coating agent can leave the coating agent pump via the already existing pump outlet.

The expression "blowing-out air" used in the context of the present disclosure is not, however, restricted to the above example of compressed air, but also covers other gaseous media.

It is possible that the blowing-out opening is connected to a compressed air line by which the blowing-out air is fed to the blowing-out opening. The compressed air line can be a ring pipeline which is, for example, already available in painting systems. However, the possibility also exists that the blowing-out air is fed in in another way.

In an example, the coating agent pump is a positive displacement pump which can be configured as a diaphragm pump. It is advantageous if the diaphragm pump is a double diaphragm pump which has two pump chambers which operate phase-shifted relative to one another and therefore have a conveying stream with a relatively low level of pulsation. It should also be mentioned that other types of positive displacement pumps can be implemented, for example, piston pumps (e.g., rotary pumps, sliding vane rotary pumps, reciprocating piston pumps, rotary piston pumps, etc.)

In the above example with a positive displacement pump, the positive displacement pump comprises at least one pump chamber, wherein the pump inlet and the pump outlet are connected to the pump chamber. Arranged in the pump chamber is at least one displacing element which, in the preferred exemplary embodiment of a diaphragm pump, is formed by a diaphragm. Furthermore, a drive is provided to be able to move the displacing element (e.g., diaphragm, piston), the drive possibly being realised pneumatically or electrically, as per se known from the prior art. It should also be mentioned at this point that an inlet valve is arranged between the pump inlet and the pump chamber, whilst an outlet valve is arranged between the pump chamber and the pump outlet.

The inlet valve and/or the outlet valve may be each configured as non-return valves and each have a valve body which is biased in a closed position by a closing spring. Such valve designs are per se known from the prior art and therefore need not be described in detail.

In the an exemplary embodiment, the ejection opening is also connected to the pump chamber to be able to eject the coating agent situated in the pump chamber by the ejection medium (e.g., blowing-out air).

During cleaning of a coating agent pump, the problem also arises that such coating agent pumps typically have dead spaces through which the flow between the pump inlet and the pump outlet does not pass, so that these dead spaces cannot, or can only insufficiently, be cleaned with the conventional cleaning described in the introductory part by conducting through a rinsing agent. Such dead spaces form in the conventional coating agent pumps, for example, in the region of the inlet valve. In an exemplary embodiment, it is therefore possible that the ejection opening opens into the dead space of the coating agent pump also to remove the coating agent from the dead space during a cleaning process.

When blowing-out air is used as the ejection medium, it is advantageous if the ejection opening opens from above into the dead space, so that the blowing-out air is conducted from above into the dead space. This is advantageous because the blowing-out air is lighter than the liquid coating agent, so that the blowing-out air displaces the coating agent when the blowing-out air is fed in from above.

It is herein advantageous if the ejection opening opens into the inlet valve also to clean the inlet valve as well as possible, wherein the ejection opening can open from above into the inlet valve for the reasons described above.

Furthermore, the ejection opening can open into the inlet valve at a site downstream behind the valve body, so that the ejection medium can also flow into the pump chamber in the closed state of the inlet valve.

It has been briefly mentioned above that the inlet valve preferably has a closing spring which is supported on a spring seat and presses the valve body into a valve seat to close the inlet valve. It is herein advantageous if the ejection opening opens into the spring seat of the inlet valve to be able to clean this region of the inlet valve as well as possible.

In an exemplary embodiment, the closing spring of the inlet valve is a helical spring which rests against the bottom of the spring seat, wherein the ejection opening can open into the bottom of the spring seat so that the ejection opening introduces the ejection medium (e.g., blowing-out air) essentially coaxially to the helical spring into the bottom of the spring seat. This advantageously leads to a good cleaning effect in the region of the inlet valve.

Furthermore, the coating agent pump according to the invention can have a controllable ejection valve which can be integrated into the coating agent pump or into the feed line of the ejection medium and controls the feed flow of the ejection medium through the ejection opening into the coating agent pump. This ejection valve can be electrically controllable, although a pneumatic or other control of the ejection valve is also possible.

It should also be mentioned that the coating agent pump may be provided not a single component, but rather, in a complete coating agent system with a coating agent pump of this type.

Also disclosed herein is a cleaning method for cleaning a coating agent pump as disclosed in the above description.

In addition to the feeding in of blowing-out air as described above, in the context of the presently disclosed cleaning method, a mixture of blowing-out air and rinsing agent can also be fed in via the blowing-out opening, particularly in pulsed form. By this means, the subsequent rinsing process is optimised.

The actual rinsing then takes place, for example, in that rinsing agent is introduced via the pump inlet, whereupon a mixture of the rinsing agent and coating agent residues is then rinsed out via the pump outlet.

Subsequently, blowing-out air can then be introduced again via the blowing-out opening to rinse out residues of the rinsing agent remaining in the coating agent pump.

BRIEF SUMMARY OF THE DRAWINGS

Other advantageous developments are disclosed in the claims or are described below in greater detail together with the description of the preferred exemplary embodiment of the invention, making reference to the drawings. In the drawings:

DESCRIPTION

Figure 1:
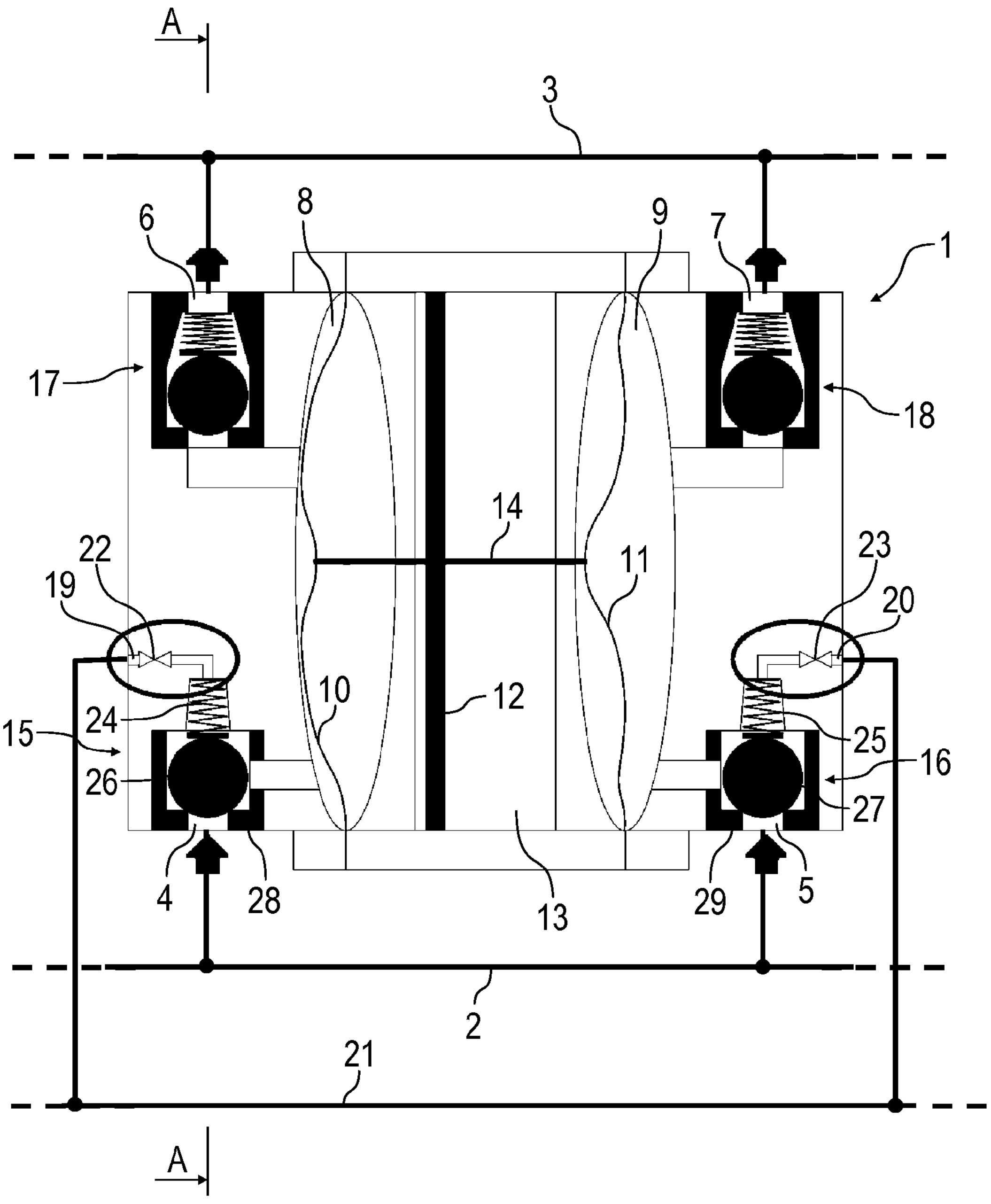
FIG. 1 shows a cross-sectional view of an example coating agent pump in a painting system.
Figure 2:
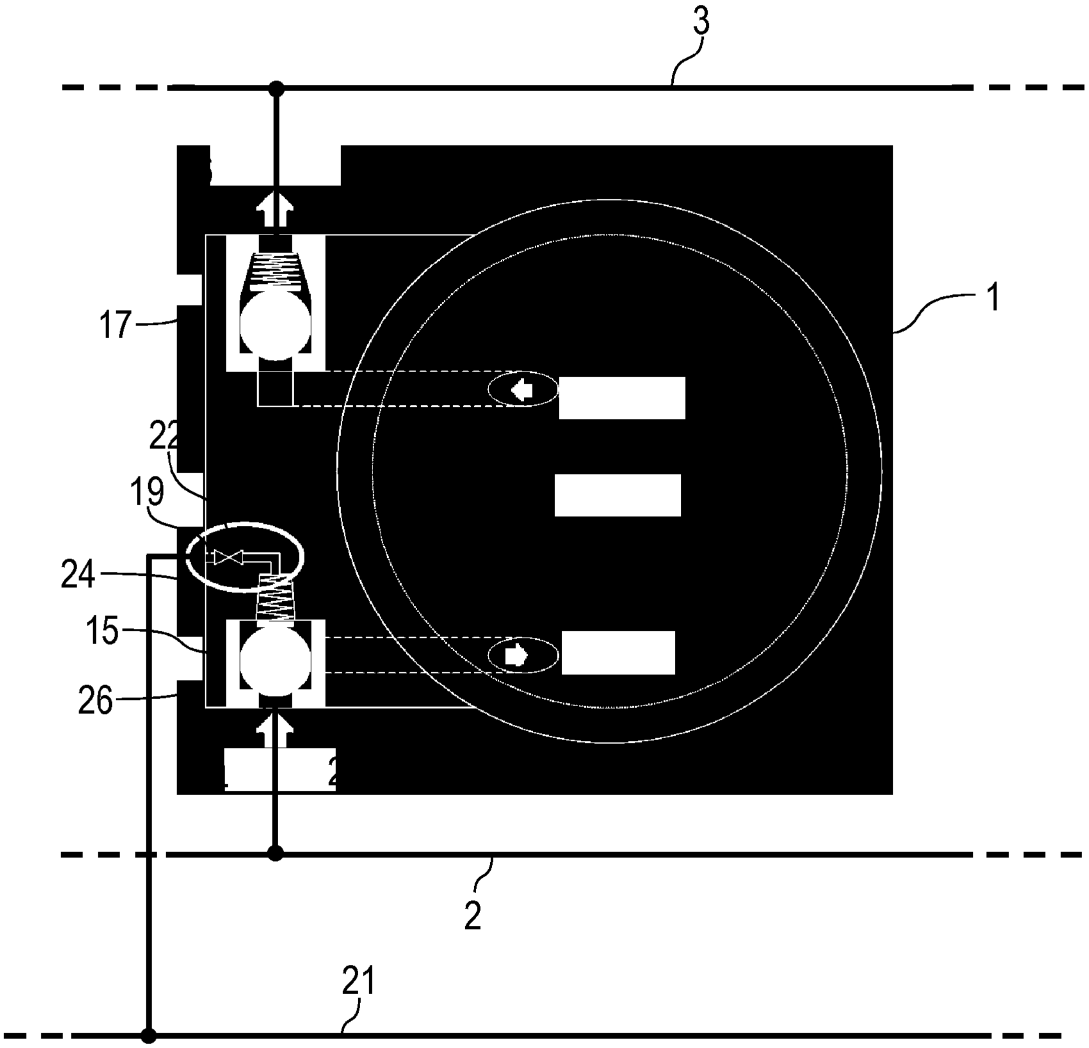
FIG. 2 shows a cross-sectional view of the coating agent pump of FIG. 1 along the section line A-A in FIG. 1.
Figure 3:
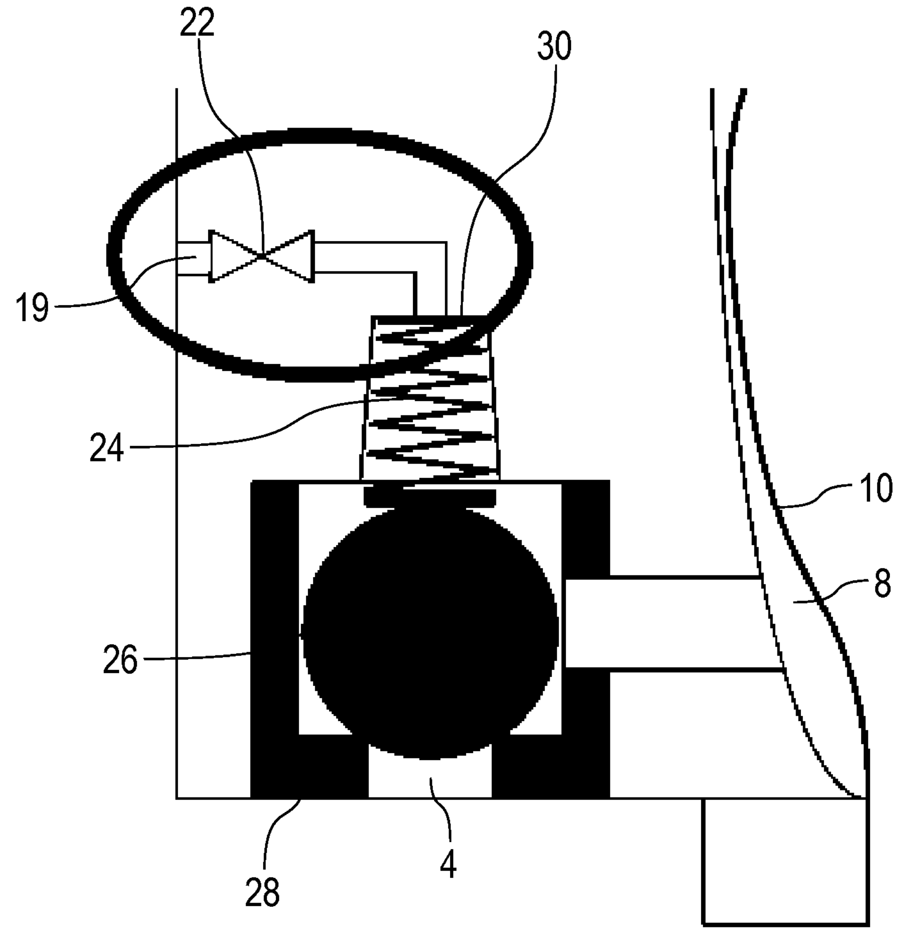
FIG. 3 shows an enlarged cross-sectional view through an inlet valve of the coating agent pump of FIGS. 1 and 2.

FIGS. 1 to 3 show an example coating agent pump 1 in a painting system for painting motor vehicle bodywork components, wherein the painting system is otherwise shown only rudimentarily because the painting system per se can be configured in a conventional manner.

The coating agent pump 1 conveys the paint to be applied from a feed line 2 to an outlet line 3, as is per se known from the prior art. For connecting to the feed line 2, the coating agent pump 1 has two pump inlets 4, 5, whilst for connecting to the outlet line 3, the coating agent pump 1 has two pump outlets 6, 7.

In this exemplary embodiment, the coating agent pump 1 is configured as a double diaphragm pump and has two pump chambers 8, 9 in each of which a flexible diaphragm 10, 11 is arranged as the displacing element.

The driving of the coating agent pump 1 is carried out by a pneumatic air motor, which is shown here schematically. The air motor comprises a piston 12 which is displaceably arranged in a cylinder 13, the piston 12 being connected by a piston rod 14 to the two diaphragms 10, 11, so that the position of the piston 12 also determines the position of the two diaphragms 10, 11 within the pump chambers 8, 9. The driving of the piston 12 takes place pneumatically in that compressed air is applied (not shown in the drawing) to the left or right side of the piston 12. In normal pumping operation, the piston 12 carries out an oscillating linear movement within the cylinder 13 and this movement is transmitted by the piston rod 14 to the two diaphragms 10, 11.

The pump inlets 4, 5 are each connected via an inlet valve 15, 16 (alternately referred to as a non-return valve) to the respective pump chamber 8 or 9.

In the same way, the pump inlets 6, 7 are each connected via an outlet valve 17, 18 (alternately referred to as a non-return valve) to the respective pump chamber 8, 9.

During the oscillating movement of the diaphragms 10, 11, therefore, coating agent is alternately drawn in via the respective pump inlet 4 or 5 and the inlet valve 15 or 16 into the pump chamber 8 or 9 and is then ejected via the respective outlet valve 17 or 18 and the pump outlet 6 or 7. The two pump chambers 8, 9 herein operate phase-shifted, so that a relatively small degree of ripple results in the pumping output of the coating agent pump 1.

Furthermore, for each of the two pump chambers 8, 9, the coating agent pump 1 has an ejection opening 19, 20 (alternately referred to as a blowing-out opening) which is connected to a compressed air line 21.

The feeding of compressed air via the ejection opening 19, 20 enables cleaning of the coating agent pump 1, as described in detail below.

In the interior of the coating agent pump 1, the ejection openings 19, 20 are each connected via an ejection valve 22, 23 to the respective non-return valve 15 or 16.

The inlet valves 15, 16 each have a closing spring 24, 25 which presses a valve ball 26, 27 into a valve seat 28, 29 to close the respective inlet valve 15 or 16. The spring seat of the closing springs 24, 25 forms a dead space within the coating agent pump 1 which does not lie in the flow path between the pump inlet 4, 5 on one side and the pump outlet 6, 7 on the other side, so that this dead space is difficult to clean in the conventional manner. The blowing-out openings 19, 20 therefore each open coaxially into a bottom 30 (see FIG. 3) of the spring seat, so that the blowing-out air introduced is introduced essentially coaxially to the respective closing spring 24, 25.

Firstly, thereby, the dead space situated in the region of the closing springs 24, 25 is effectively cleaned of coating agent.

Secondly, it should be considered that the blowing-out air is introduced from above, which contributes to an effective cleaning action. This is due thereto that the blowing-out air is lighter than the liquid coating agent so that the blowing-out air introduced effectively removes the coating agent from the inlet valves 15, 16 and thereby thoroughly cleans the coating agent pump 1.

Figure 4:
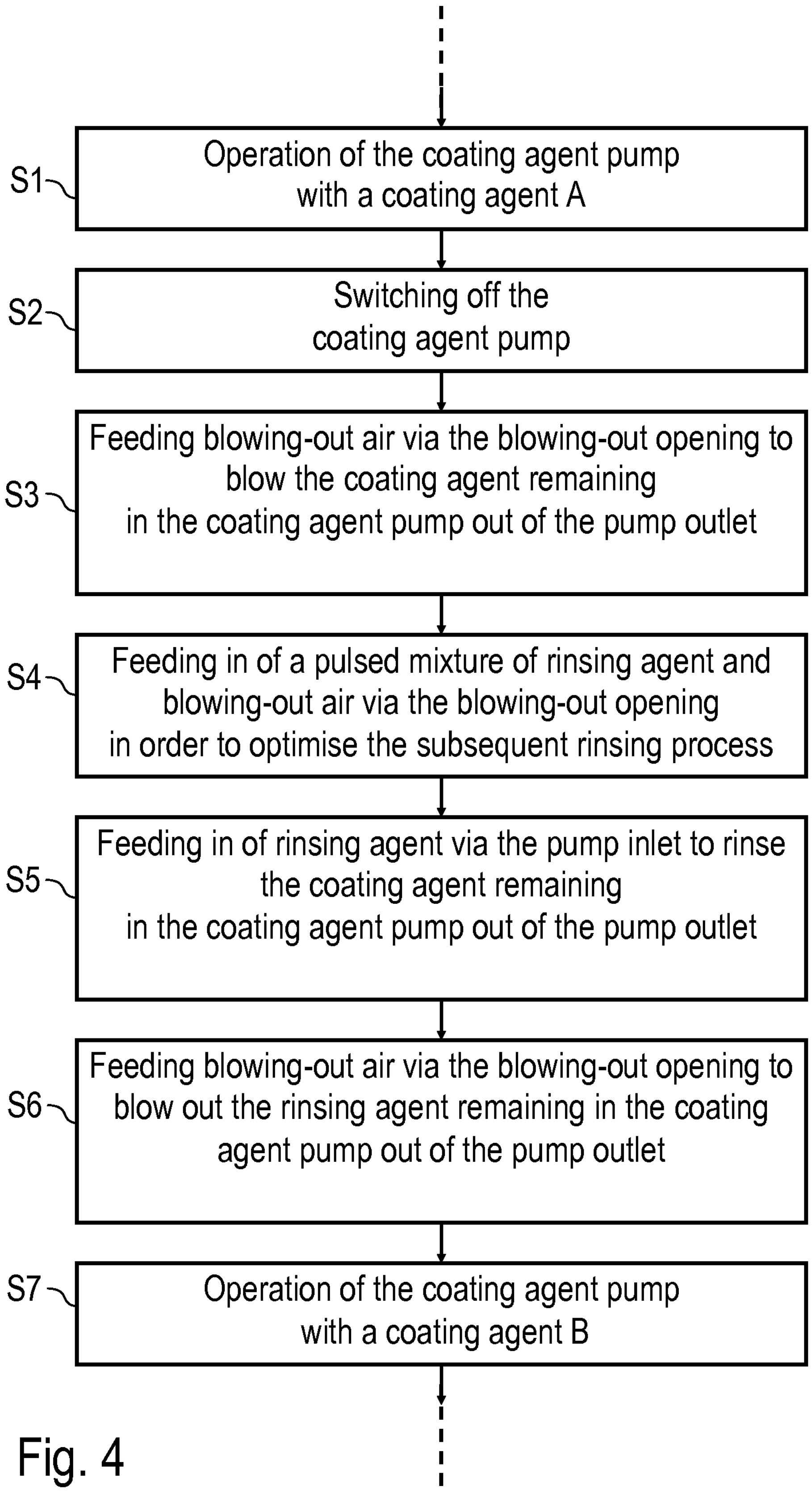
FIG. 4 shows a flow diagram to illustrate a cleaning process.

The cleaning method which is carried out on a paint change of the coating agent pump 1 will now be described making reference to the flow diagram in FIG. 4.

In a first step S1, initially operation of the coating agent pump 1 with a coating agent A is still taking place.

On a paint change, next in step S2, the coating agent pump 1 is stopped, i.e. no further driving of the piston 12 takes place.

In a subsequent step S3, blowing-out air is then fed in via the ejection openings 19, 20 to remove the coating agent A remaining in the coating agent pump 1 as fully as possible from the coating agent pump 1. The coating agent remaining in the coating agent pump 1 is herein blown out of the coating agent pump 1 via the pump outlets 6, 7.

Subsequently, in step S4, feeding in of a pulsed mixture of rinsing agent and blowing-out air takes place via the blowing-out openings 19, 20 to optimise the subsequent rinsing process.

During the actual rinsing in step S5, the rinsing agent is then fed in via the pump inlets 4, 5 and ejected again via the pump outlets 6, 7.

In step S6, blowing-out air is then fed in via the ejection openings 19, 20 to rinse out the rinsing agent remaining in the coating agent pump 1 via the pump outlets 6, 7.

The invention is not restricted to the above-described preferred exemplary embodiments. Rather a plurality of variants and derivations is possible which also make use of the inventive concept and therefore fall within the scope of protection. In particular, the invention also claims protection for the subject matter and the features of the subclaims separately from the claims to which they each refer.

The invention claimed is:

1. A positive displacement coating agent pump for conveying a coating agent, comprising:
- a pump chamber, having a pump inlet arranged to receive the coating agent and a pump outlet arranged to deliver a coating agent, the pump inlet and pump outlet being connected to the pump chamber;
- a displacing element arranged in the pump chamber;
- a drive arranged to move the displacing element;
- an inlet valve between the pump inlet and the pump chamber; and
- an outlet valve between the pump chamber and the pump outlet
- an ejection opening arranged to allow cleaning of the coating agent from within the coating agent pump, the ejection opening opens into the inlet valve to rinse the inlet valve.

2. The coating agent pump of claim 1, wherein the ejection opening opens from above into the inlet valve.

3. The coating agent pump of claim 2, wherein the inlet valve includes a valve body and the ejection opening opens into the inlet valve at a site downstream of the valve body to allow the ejection medium to flow into the pump chamber in the closed position of the inlet valve.

4. The coating agent pump of claim 3, wherein the closing spring of the inlet valve is supported on a spring seat and presses the valve body into a valve seat, wherein the ejection opening opens into the spring seat.

5. The coating agent pump of claim 4, wherein the closing spring of the inlet valve is a helical spring which is supported on the bottom of the spring seat, wherein the ejection opening opens into the bottom of the spring seat.

6. The coating agent pump of claim 5, wherein the ejection opening opens essentially coaxially with the helical spring into the bottom of the spring seat.

7. The coating agent pump of claim 1, further comprising a controllable ejection valve which is integrated into one of the coating agent pump and the feed line of the ejection medium, and controls the feed flow of the ejection medium through the ejection opening into the coating agent pump.

8. A method for removing coating agent from a coating agent pump, wherein the coating agent pump comprises a pump inlet and a pump outlet, the method comprising:
- removing coating agent situated in the coating agent pump using an ejection opening that is provided in the coating agent pump in addition to the pump inlet and the pump outlet
- operating the coating agent pump with a first coating agent;
- switching off the coating agent pump so that the coating agent pump conveys no further coating agent;
- feeding in blowing-out air via the ejection opening to eject the remaining coating agent situated in the coating agent pump;
- feeding in a mixture of blowing-out air and rinsing agent via the ejection opening;
- feeding in rinsing agent via the pump inlet to rinse the coating agent pump with the rinsing agent, wherein the rinsing agent is ejected with the rinsed out coating agent via the pump outlet;
- feeding in blowing-out air via the ejection opening to eject the rinsing agent situated in the coating agent pump; and
- operating the coating agent pump with a second coating agent.

* * * * *